United States Patent [19]

Ivestor et al.

[11] 3,774,999

[45] Nov. 27, 1973

[54] ANALOG INFORMATION STORAGE AND RETRIEVAL SYSTEM

[76] Inventors: Andrew S. Ivestor, 23 Sullivan St., Charlestown; William R. Wray, 46 Russell St., Brookline, both of Mass.

[22] Filed: Oct. 2, 1972

[21] Appl. No.: 294,469

[52] U.S. Cl. .............................. 352/12, 179/100.2 K
[51] Int. Cl. .............................................. G03b 31/00
[58] Field of Search .................... 352/12, 25, 26, 27; 179/100.2 K

[56] References Cited

UNITED STATES PATENTS

| | | | |
|---|---|---|---|
| 3,646,258 | 2/1972 | Lemelson | 352/123 X |
| 3,266,862 | 8/1966 | Wagoner | 352/12 |
| 3,674,348 | 7/1972 | Figge | 352/12 X |

*Primary Examiner*—Monroe H. Hayes
*Attorney*—Brown & Mikulka

[57] ABSTRACT

An information storage and retrieval system in which an information signal is recorded on a record medium simultaneously with a pilot reference signal. A reproducing system is provided in which samples of the recorded information signal are read from the record into an analog storage register at a rate determined by the reproduced pilot signal, and read out of the analog storage register at a fixed rate to compensate for differences in the speeds at which the information is stored on, and retrieved from, the record.

32 Claims, 7 Drawing Figures

ANALOG INFORMATION STORAGE AND RETRIEVAL SYSTEM

This invention relates to information storage and retrieval, and particularly to a novel analog information storage and retrieval system in which the effects of differences in storage and retrieval speeds are reduced.

Storage of information on a record medium by sweeping a transducer over the record medium, and the subsequent retrieval of the information by sweeping another transducer over the record medium, usually result in variations in frequency between the recorded and reproduced signals because of instantaneous differences in the speed at which the recording and playback transducers are moved relative to the record medium. Such effects are termed wow and flutter, and are commonly encountered in tape and disk recorders. Thus, one measure of the quality of a tape recorder is the degree to which these effects have been reduced by the attainment of precise and constant tape transport speeds.

A particularly onerous frequency deviation problem is encountered in the production of sound motion pictures for which the sound track is to be recorded on the film strip. The conflicting requirements for incremental film advance from frame to frame, and constant speed of the sound track relative to the playback head, are difficult to resolve without elaborate apparatus.

One approach to this problem is to provide an incremental drive for film advance at the projection station, and a separate constant speed film drive at a remote playback station. The projection and playback stations are separated by a relatively large loop of film, and synchronized in some fashion so that the loop maintains the same constant average length, within the limits required to preserve lip synchronization between the sound track and the photographic scene. This approach obviously involves a relatively complex drive and synchronization system.

It would obviously be highly desirable to reduce the requirements for speed uniformity on signal reproducing systems of the kind described, and a primary object of the invention is to do so. A more particular object of the invention is to facilitate the production of sound motion pictures of the kind in which the sound track is recorded on the film strip.

Briefly, the above and other objects of the invention are attained by a novel signal reproduction system in which a compensator is included that derives frequency deviation information from a recorded pilot signal, and uses this information to correct the frequency of the reproduced information signal so that the original recorded signal is recreated. For this purpose, a pilot clock pulse train is derived from the recorded pilot signal. The clock pulse train so produced comprises pulses at intervals that may differ, but which represent equal time intervals in the original recording process. These signals are used to gate samples of the reproduced information signal into an analog storage register.

A source of reference clock pulses is provided which consists of pulses at equal intervals that are in accordance with the intervals between the pilot clock pulses except for frequency shifts due to speed changes between recording and reproduction that appear as variations in the duration between pilot clock pulses. These reference clock pulses are used to increment the address of a location in the storage register that is connected to an output terminal.

On the output terminal appears a signal representing the contents of one address in the storage register until the next reference clock pulse, whereupon the signal is changed to repeat the contents of the next storage location in the register. This output terminal is connected through a low pass filter to any desired utilization device, such as a loudspeaker or the like, where the originally recorded information is reproduced.

Because it is desired to keep the total number of storage locations in the analog storage register reasonably small, persistent speed errors, or very low frequency wow deviations in frequency, would tend to cause the read-in and read-out circuits to cross over in the memory, with the result that an information jump in time equivalent to the full contents of the storage register would occur, with an abrupt transition in the output that would represent a considerable distortion of the original signal. To prevent that occurrence, an address comparator is preferably employed to detect the approach of the input and output addresses and to omit either pilot clock pulses, or reference clock pulses, until the addresses regain at least a predetermined minimum separation. In addition, an electronic servomechanism responds to the address difference to provide a fine control on the output clock rate that tends to provide a relatively constant maximum separation between the addresses with a time constant that is long enough to be effective primarily in the upper range of wow errors. Finally, if desired, a speed control mechanism for the apparatus that drives the record relative to the playback transducer can be employed, so that very low frequency errors, or constant frequency difference errors, can be substantially eliminated.

The manner in which the apparatus of the invention is constructed, and its mode of operation, will best be understood in the light of the following detailed description, together with the accompanying drawings, of various illustrative embodiments thereof.

Figures 1, 2, 3:
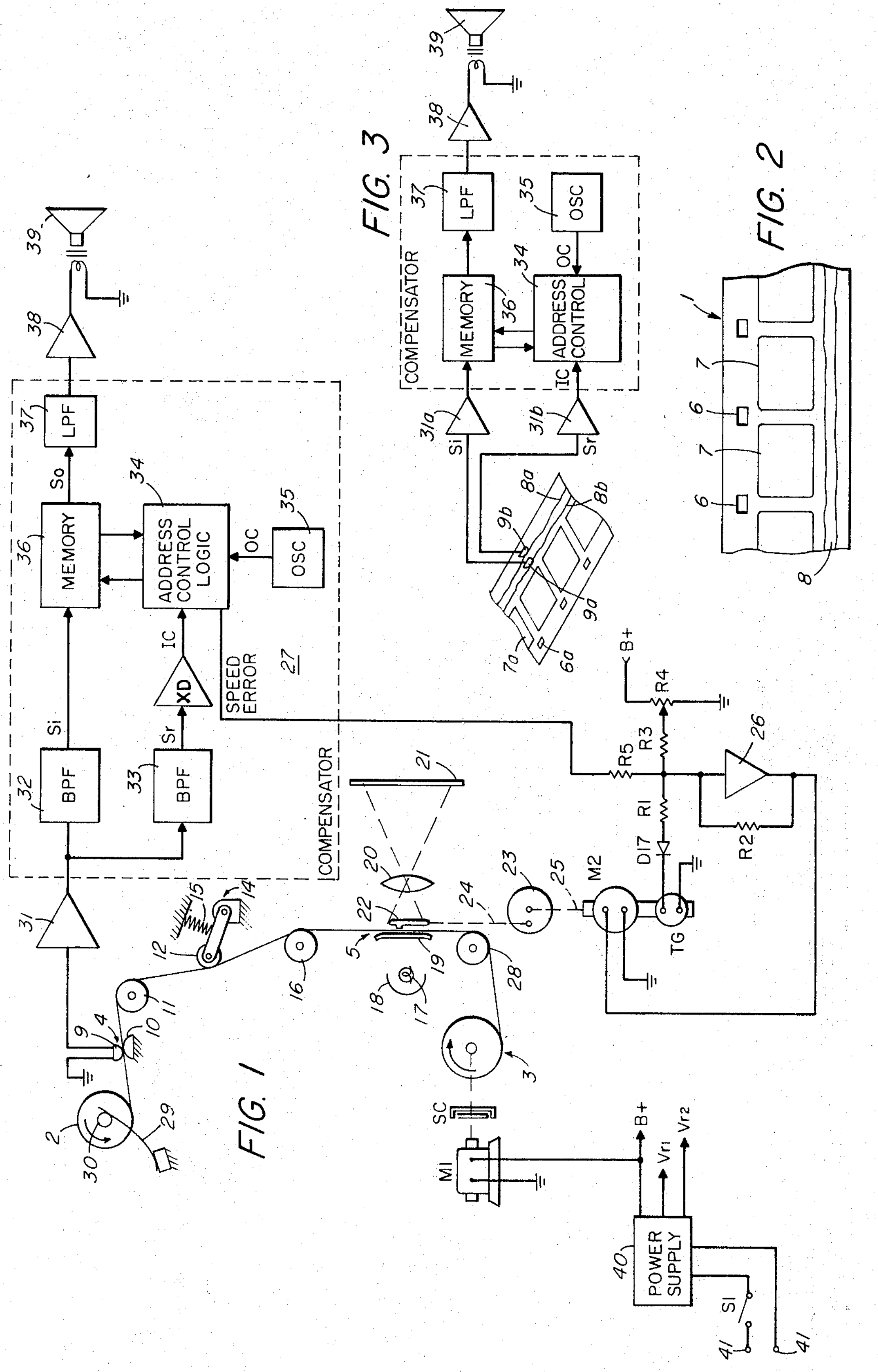
FIG. 1 is a schematic block and wiring diagram of a motion picture projection system in accordance with the invention.
FIG. 2 is a fragmentary elevational sketch, with parts broken away, showing schematically a sound motion picture film strip adapted for use in the system of FIG. 1.
FIG. 3 is a schematic and fragmentary diagram of a modification of the system of FIG. 1.
Figure 4:
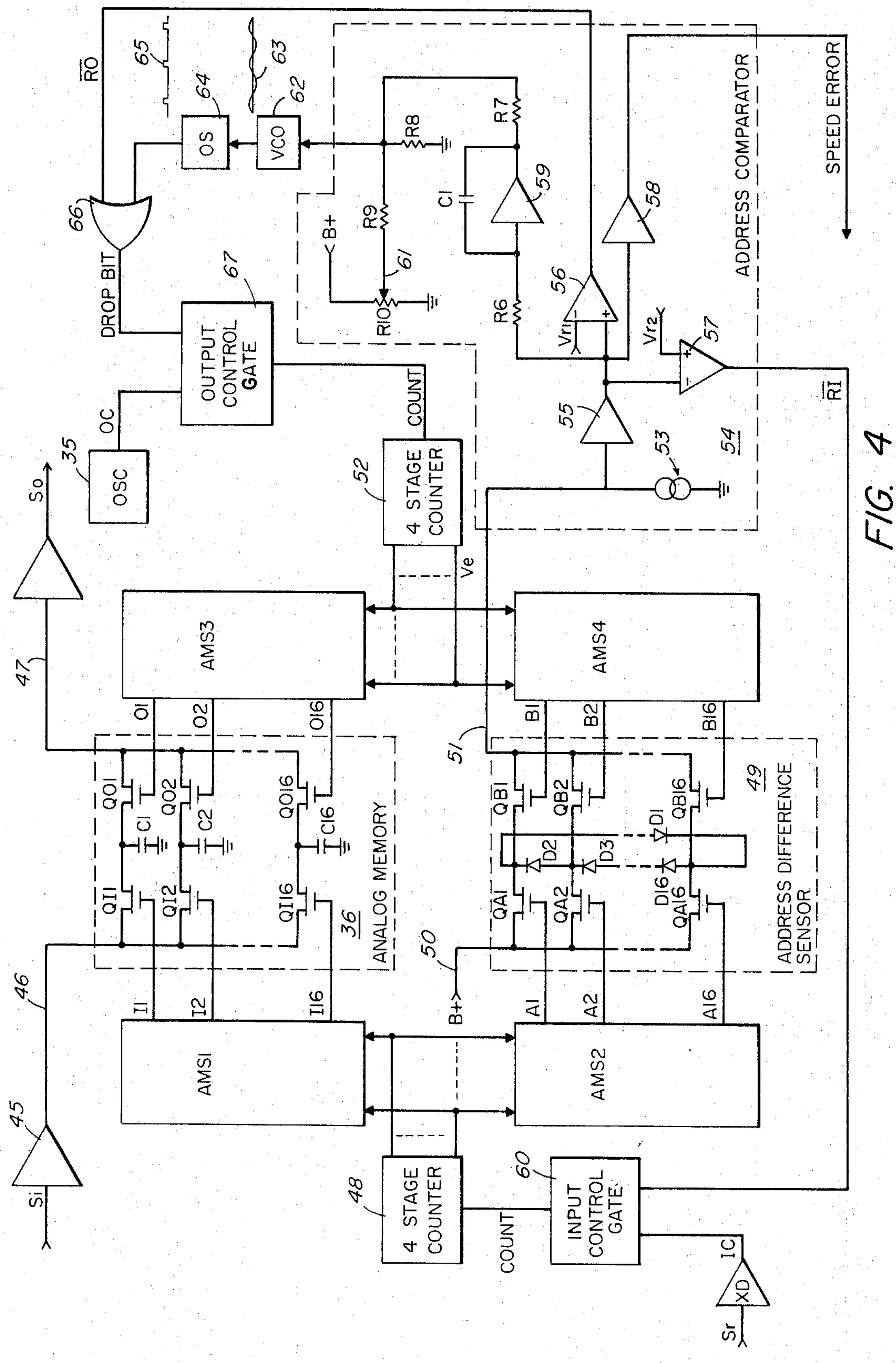
FIG. 4 is a schematic block and wiring diagram of an analog memory, and an address control system therefor, suitable for use in the apparatus of FIGS. 1 or 3.
Figure 7:
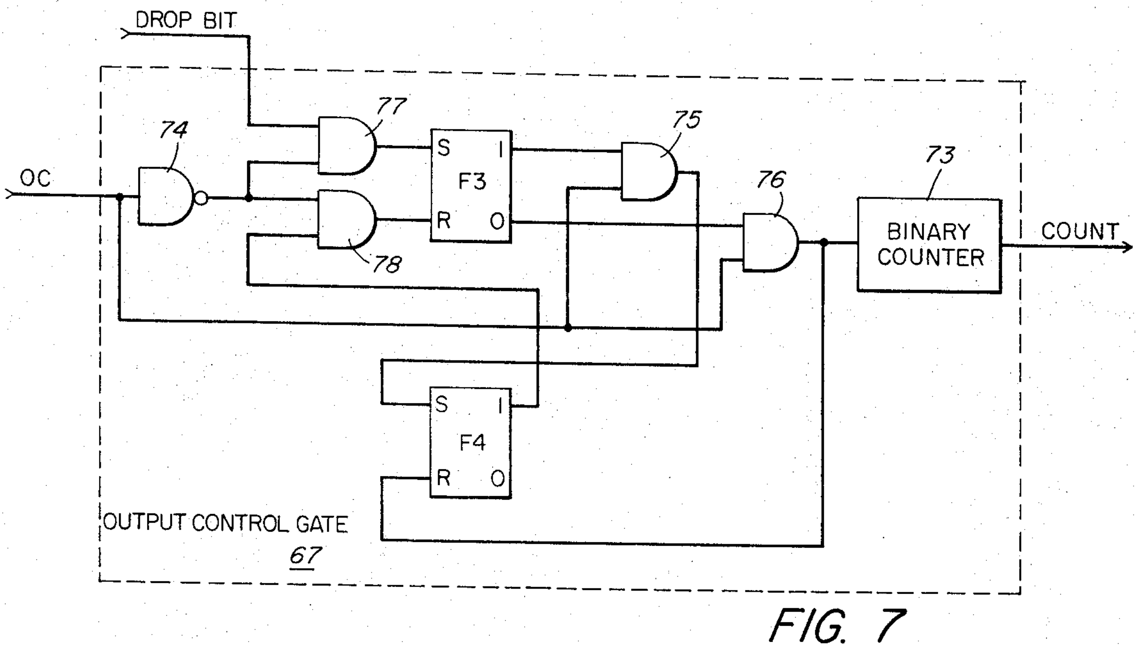

FIG. 7 is a schematic block and wiring diagram of an output control gate forming a part of the control circuit of FIG. 4; and Referring to FIG. 1, there is shown a motion picture projection system which may be of conventional construction except as specifically noted. In particular, a strip of motion picture film generally designated 1 is shown extending between a supply reel 2 and a take-up reel 3 over a path through a playback station generally designated 4 and a projection station generally designated 5.

Referring to FIG. 2, the film 1 is provided along at least one edge with a series of regularly spaced sprocket holes 6 that serve in a conventional manner to cooperate with incremental drive apparatus for allowing the film to be advanced a frame at a time past the projection station 5. On the film 1 are photographically recorded frames, each comprising a photographic transparency in a motion picture sequence, which frames are adapted to be viewed by intermittent projection sequence.

Along at least one edge of the film 1 there is a strip of magnetic material generally designated 8, such as magnetic iron oxide or the like, on which a sound track can be recorded, preferably as the film is being exposed. Alternatively, the sound track can be photographically recorded, and reproduced by photoelectric means.

The sound track 8 cooperates with a conventional playback head 9, of the electromagnetic type for magnetic recording. The head 9 is arranged to engage the track 8 at the playback station 4, and to be urged into light engagement with the surface of the film 1 for that purpose by means schematically indicated as a resilient pressure pad 10.

The film 1 extends from the supply reel 2 through the playback station 4 just described, and thence over a first idler roll 11, and against a bobulator roller 12 journaled for rotation to a lever 13. The lever 13 is pivoted to the frame of the apparatus as suggested at 14, and is resiliently urged toward the film 1 by a spring 15.

As a frame of film is taken by the film drive pawl in a manner to be described, the spring 15 may be compressed to allow the film path to be momentarily shortened. Thus, the motion of the film past the playback station 4 can be relatively uniform.

The film 1 next passes around a fixed idler 16 rotatably mounted on the frame in the conventional manner, not shown, and thence past the projection station 5. At the projection station 5, conventional projection apparatus is provided comprising a lamp 17 provided with a reflector 18 arranged to direct a beam of light through a suitable framing aperture, not shown, in a conventional pressure plate 19. The pressure plate 19 serves to locate the focal plane of the film 1. Light transmitted through the film passes through a conventional lens system, schematically indicated at 20, onto any convenient viewing screen schematically shown at 21.

The film is arranged to be incrementally advanced past the projection station by a conventional film drive mechanism, schematically shown as comprising a drive pawl 22 connected to a crank 23 as suggested at 24. The crank 23 is arranged to be rotated by a shaft 25 driven by a conventional motor M2.

As the shaft 25 rotates the crank 23, the pawl 22 is reciprocated and oscillated in a conventional manner to engage one of the sprocket holes 6 and advance the film by one frame length, and then disengage the film and return to the position for the next feed stroke in engagement with the subsequent sprocket hole 6. This operation will be familiar to those familiar with motion picture projectors, and need not be further described.

Preferably, the speed of the motor M2 is controlled by a speed control circuit that causes a conventional amplifier 26 to drive the motor at a film speed that will maintain the sound reproduced from the track 8 at the frequency at which it was recorded. For that purpose, a tachometer generator TG may be arranged to be driven by the shaft of the motor M2, and to provide a signal repeating the actual speed of the motor M2. This signal is rectified by a diode D17 and supplied through a summing resistor R1 to the input terminal of the amplifier 26. The amplifier 26 may be provided with a conventional feedback resistor R2.

A second summing resistor R3 supplies a signal component from a potentiometer comprising a variable resistor R4 connected between a DC supply terminal at a potential B+ and ground. The supply potential at B+ is present at this terminal, and at other points to be described, when a switch S1 is closed. The switch S1 supplies energy to a conventional power supply 40 from line terminals 41. The power supply 40 also produces reference potentials $Vr_1$ and $Vr_2$, for purposes to be described.

The potentiometer R4 has an adjustable wiper that can be positioned to cause the motor M2 to be driven at a predetermined fixed speed in the absence of an error in synchronization between the speed at which the original pictures were taken and the sound recorded and the speed at which they are being reproduced.

A speed error signal for that purpose is provided by a frequency compensator 27, to be described, and appled through a summing resistor R5 to the input terminal of the amplifier 26. This signal may be positive or negative depending on the departure of the motor speed from the correct speed.

With the electronic servomechanism to be described, the tachometer generator is not necessary for most practical purposes, as open loop control will suffice. In addition, a synchronous AC motor could be substituted for the controlled motor M2, and its amplifier 26 and attendent circuits, with perhaps a somewhat larger memory required for the same standards of performance.

The take-up reel 3 for the film 1 is arranged to be driven by a motor M1 through a slip clutch SC. The motor M1 may be a conventional DC motor arranged to be supplied with drive current from the supply terminal at B+. The fixed speed of the motor M1 is selected to be in excess of the maximum speed of the film 1 produced by the intermittent reciprocation of the pawl 22.

The film 1 extends from the projection station 5 over an idler 28 to the take-up reel 3. Tension on the film 1 is provided by a brake, schematically indicated as a resilient arm 29 engaging the hub 30 of the supply reel 2, as well as by frictional components introduced at the playback station 4, by the idlers 11, 16 and 28, by the bobulator roller 12, and by the pressure plate 19 at the projection station. These components are designed to be sufficient that the slip clutch SC will normally slip, with the film 1 remaining stationary at the projection station 5, except when the pawl 22 advances the film and allows a frame to be taken by the supply reel.

The film 1 will thus be relatively continuously moved past the playback station 4 at a more or less uniform speed, and will be incrementally advanced at the projection station, with concommitant motion of the bubulator roller 12 to vary the film path length with these incremental film advance strokes so that the average speed at the playback station can be maintained.

The film will be taken up on the take-up reel 3 as it is advanced by the pawl 22.

It will be apparent that perfect isolation between the playback station and the projection station cannot be obtained by the mechanism just described. In particular, a strong flutter frequency component at the film projection rate, for example, from 18 to 24 cycles per second, will be introduced in this manner. Other wow and flutter components will also be present. These factors are removed by the compensator 27 in a manner next to be described.

The playback head 9 is connected between ground and the active input terminal of a conventional preamplifier 31. The active output terminal of the amplifier 31 is connected in parallel to two band pass filters 32 and 33. The sound signal for the film may be recorded in a band from, for example, 100 Hz to 6,000 Hz for reasonably good fidelity. A pilot tone comprising a constant signal at 7,500 Hz may be recorded on the same track 8.

The filter 32 is arranged to pass the sound signals in the range from 100 to 6,000 Hz, and the filter 33 has a pass band sufficient to accommodate the 7,500 cycle pilot tone and its frequency deviations that may be introduced by wow and flutter, and particularly the strong component introduced by the intermittent motion of the film at the projection station 5.

The output signal from the filter 33, labeled Sr in FIG. 1, is supplied to a zero crossing detector XD, of any conventional construction, which preferably produces an output pulse at each zero crossing of the reference signal Sr, and accordingly produces a train of clock pulses IC at the rate of 15,000 per second. These clock pulses IC are applied to address control logic circuits schematically indicated at 34 and to be described in more detail below.

A fixed train of clock pulses OC is provided by a local oscillator 35. The oscillator 35 may have a fixed repetition rate of 15,000N+M pulses per second, equal to N times the nominal repetition rate of the clock pulses IC, plus a sufficient number M, say 8,000 to permit control of the output sampling rate in a manner to be described. The factor N may be 8, for example. These pulses OC are also supplied to the address control logic circuits 34, for purposes to be described.

The uncorrected aduio signal Si from the band pass filter 32 is supplied to an analog memory 36, shown in block form in FIG. 1, and to be described in more detail below. The address control logic circuits 34 direct the entry of samples of the signal Si into the memory 36 in time with the clock pulses IC, and produce an output signal So that is changed in time with pulses derived from the clock pulses OC by an electronic servomechanism, to be described. As the several stages of the memory are entered by the samples Si, they are taken out in sequence to sequentially determine the amplitude of the signal So.

Feedback from the memory 36 to the address control logic circuits 34 is provided, in a manner that will be described. Should the pulses IC that read samples into the memory be too much faster or too much slower in arriving than the output gating pulses derived from the pulses OC, this feedback control provided for the dropping of one or more of the clock pulses IC, or one or more of the pulses derived from the pulses OC, so that crossover in the memory does not occur.

The output signal So from the memory is an analog signal that remains essentially constant between output gating pulses and then changes to a new value at each output gating pulse. This signal is supplied through a low pass filter 37 to a conventional audio amplifier 38 that actuates a loudspeaker 39, or other desired utilization device.

If desired, a harmonic of the reference signal Sr may be used to generate the clock pulses. For example, following the band pass filter 33, a fifth harmonic selector could be incorporated to generate and selectively apply the fifth harmonic of the reference signal to the zero crossing detector XD. That would produce clock pulses IC at a considerably higher rate, and thus improve the fidelity of the output signal by increasing the sampling rate. A corresponding increase in the frequency of the oscillator producing the clock pulses OC would be necessary for this purpose. The size of the memory needed for a given degree of flutter correction is proportional to this sampling rate increase, however.

FIG. 3 shows a modification of the apparatus of the invention in which band pass filtering is not required, and in which the recorded information signal can occupy a band including the frequency of the reference signal. Specifically, a film strip 1*a* may otherwise be the same as that shown at 1 in FIG. 2, except that two sufficiently spaced magnetic recording tracks 8*a* and 8*b* are provided. An information signal Sr is recorded on one of the tracks and reproduced by a head 9*a*. The reference signal is recorded on a spaced track 8*b*, and reproduced by a playback head 9*b*.

The reproduced signals are applied to amplifiers 31*a* and 31*b*, respectively, to provide the information signal Si and reference signal Sr in the same manner and for the same purposes described above in connection with FIG. 1. Since these signals are recorded on separate tracks of the film, they may be physically rather than electronically isolated. The apparatus may otherwise be described above in connection with FIG. 1. If the recorded pilot reference frequency is in the information signal band, it should be multiplied, as by harmonic generation in the manner discussed above, to provide a sampling rate that is at least twice the highest information frequency.

FIG. 4 shows the analog memory and its address control circuits in more detail. The memory 36 may be a 16 stage capacitor memory addressed by field effect transistors and selected from those conventionally available units using field effect transistors manufactured by conventional MOS techniques.

The information signal Si is supplied through a conventioal voltage following amplifier 45 to a lead 46. A sample of the signal on the lead 46 may be stored in any of a set of capacitors C1 through C16 in dependence on which one of a set of electronic switches, here shown as a set of 16 field effect transistors, designated QR1, QR2, etc., through QR16, is conducting. One of the transistors is selected by application of a logic 1 signal on one of a set of 16 address leads I1 through I16 to the base of the transistor to gate it into conduction and thereby supply a charging path from the lead 46 to the capacitor so selected.

A signal comprising the sample stored on any one of the capacitors C1 through C16 may be applied to an output lead 47 when the load terminals of a corresponding output switch, shown as a set of field effect transistors Q01, Q02, etc., through Q016, are rendered conductive. That is accomplished by the application of an output gate signal at logic 1, on one of a set of leads 01 through 016, applied to its base terminal.

The input address selection signals I1 through I16 are supplied by an analog multiplex switch AMS1, of any conventional design, arranged to apply a logic 1 signal to one of the 16 output terminals I1 through I16 in response to a different one of a set of 16 digital codes on a set of four input leads and supplied from the output terminals of a four-stage binary counter 48. The counter 48 is successively advanced through its 16 states by each of a series of applied count pulses, and thus sequentially addresses the 16 stages of the memory in a cyclic sequence.

The output terminals of the counter 48 also drives a second analog multiplex switch AMS2 in synchronism with the switch AMS1. The switch AMS2 provides 16 output leads A1 through A16 which are connected to the bases of a set of 16 field effect transistors QA1 through QA16 in an address difference sensor 49.

Each of the transistors QA1 through QA16 is associated with a different one of a second set of 16 field effect transistors QB1 through AB16, and has one load terminal connected to a lead 50 on which the supply voltage at the potential B+ appears. Each of the transistors QA1 through QA16 has a second load terminal connected to one load terminal of an associated transistor QB1 through QB16. A second load terminal of each of the transistors QB1 through QB16 is connected to a lead 51, upon which a signal labeled Ve, to be described below, appears.

A diode ring, comprising 16 diodes D1 through D16, interconnects the common junctions of the transistor pairs QA and QB. Specifically, a diode D1 has its anode connected to the interconnected load terminals of the transistors QA1 and QB1, and its cathode connected to the interconnected load terminals of the transistors QA16 and QB16. Similarly, a diode D2 has its anode connected to the interconnected load terminals of the transistors QA2 and QB2, and its cathode connected to the interconnected load terminals of the transistors QA1 and QB1, and so on.

The signals 01 through 016, one and only one of which is always at logic 1 to select one of the transistors Q01 through Q016 for conduction, are provided by a conventional analog multiplex switch AMS3, and the energized one of the output leads 01 through 016 is selected by the digital code appearing on the four output terminals of a four stage binary counter 52. The output terminals of the counter 52 are also connected to an analog multiplex switch AMS4, which produces a logic 1 signal on one and only one of 16 leads B1 through B16 in response to the current state of the counter 52. The counter 52 is sequentially cycled through its 16 states by count pulses applied to its input terminal.

In the operation of the apparatus, one of the transistors QI1 through QI16, and a correspondingly numbered one of the transistors QA1 through QA16, is always conducting. Similarly, one of the transistors Q01 through Q016, and a correspondingly numbered one of the transistors QB1 through QB16, is always conducting.

The conducting one of the input transistors QI selects the memory location into which information is to be entered from the lead 46. The energized one of the output transistors QO selects the storage location from which information is to be read out onto the lead 47.

Thus, the conducting one of the transistors QA1 through QA16 identifies the input address, in the memory 36, and the conducting one of the transistors QB1 through QB16 identifies the output address in the memory 36. It is desired to keep these addresses apart, so that data entry does not overtake data output, or data output overtake data entry, to prevent the occurrence of a memory crossover.

The memory address difference sensor 49 provides a signal that permits this control to be accomplished. Specifically, a circuit path extends from the supply terminal at B+ over the lead 50 and through the conducting one of the transistors QA, and thence through one or more of the diodes D1 through D16 in the forward conducting direction, out through the conducting one of the transistors QB to the lead 51, and thence to ground through a conventional constant current source 53, in a functional unit identified by a dotted outline as an address comparator 54. The voltage on the lead 51 is thus essentially B+ less the number of forward drops that are represented by the number of diodes between the load terminal of the conducting transistor QA and the load terminal of the conducting transistor QB. The constant current source 53 is included because the voltage drop through a diode in the forward direction is a function of the current through the diode. It is desired to have these drops constant regardless of the number of conducting diodes in the circuit path.

As an example, suppose that information was being read into address 2 and out of address 16. Thus, transistors QI2, Q016, QA2 and QB16 would be conducting. The sensing circuit path would thus extend from the lead 50 through the load terminals of transistor QA2, through the diodes D2 and D1 in series, and through the load terminals of the transistor QB16 to the output lead 51. Two forward diode gaps, in addition to two field effect transistor load terminal gaps, would thus separate the potential of the lead 51 from the supply potential at B+. If the output address was changed from 16 to 1, transistors Q01 and QB1 would be rendered conducting, and in that case only the diode D2 would separate the potential supplied by the transistor QA2 from the potential received by the output transistor QB1.

The address difference signal Ve appearing on the lead 51 is applied to a buffer amplifier 55. The output signal from the amplifier 55 is applied to a first voltage comparator comprising an operational amplifier 56. The signal from the amplifier 55 is applied to the non-inverting input terminal of the amplifier 56.

A first reference voltage $Vr_1$, from any suitable source of reference potential, that is slightly less than one forward diode gap less than the supply potential at B+, is applied to the inverting input terminal of the amplifier 56. The amplifier 56 is arranged to produce a logic 1 signal labeled $\overline{R0}$ when the diode path from the selected input transistor QA that is currently conducting to the output transistor QB that is currently conducting is one forward diode gap or less. If there are more diodes in this path, the signal from the amplifier 56 will be zero.

For example, if the input address was 2, with transistor QA2 conducting, and the output address was 1 or 2, it would be desired to hold the output address while the input address advances to prevent a crossover. Under these conditions, the signal $\overline{R0}$ would be produced.

The signal from the amplifier 55 is also applied to the inverting input terminal of a second operational amplifier 57, which also serves as a comparator, in this case serving to produce a signal that is at a logic 1 level, labeled $\overline{RI}$, when there are at least 15 diode forward gaps between the conducting transistor QA and the conducting transistor QB. For this purpose, a second reference voltage $Vr_2$ is applied to the non-inverting input terminal of the amplifier 57. When the signal $\overline{RI}$ is produced, the input address is not allowed to advance until the output address has been advanced to remove the signal $\overline{RI}$.

The voltage at the output of the amplifier 55 represents the difference between the input and output addresses in terms of a voltage which fluctuates between a value proportional to B+ minus one forward diode gap to a value proportional to B+ minus 15 forward diode gaps. This difference signal is applied to a conventional amplifier 58 to provide a speed error signal that is bipolar and properly scaled to adjust the speed of the motor M2 in FIG. 1 in a direction to tend to maintain the address difference at the central point in the allowable range. The time constant of the servomechanism comprising the motor M2 is such that this control is effective primarily in the low range of wow deviations.

The signal $\overline{RI}$, together with the clock pulses IC from the zero crossing detector XD, are applied to an input control gate 50 which provides COUNT pulses, in a stream corresponding to the clock pulse stream IC, except that when a signal $\overline{RI}$ is present, a pulse is deleted from the count pulse stream. The input control gate 60 will be described below in more detail in connection with FIG. 5.

The output signal from the amplifier 55 is also applied to a conventional integrator comprising an amplifier 59 having an input resistor R6 and a feedback capacitor C1. The time constant R6C1 is selected so that the output signal from the amplifier 59 will be significantly different from zero only in response to relatively low frequency wow or flutter shifts in the output signal from the amplifier 55.

The active output terminal of the amplifier 59 is connected to ground through a summing resistor R7 and a current limiting resistor R8, to produce a voltage component across the resistor R8 determined by the integral of the address difference. A fixed reference voltage component is produced across the resistor R8 by a potentiometer comprising a resistive element R10 connected between the supply terminal at B+ and ground and having an adjustable wiper 61 connected through a summing resistor R9 to the upper terminal of the resistor R8.

The signal appearing across the resistor R8 varies the frequency of a conventional voltage controlled oscillator 62 about a predetermined value M attained when there is no appreciable output signal from the amplifier 59. When the integrated address difference signal from the amplifier 59 indicates that samples are being read into the memory consistently faster than they are being read out, the frequency of the oscillator 62 is reduced. When samples are being read out of the memory faster than they are read in, the frequency of the oscillator 62 is increased. This adjustment effects an electronic servocontrol over the input and output memory addresses in a manner to be described below.

At each positive going zero crossing of the output signal 63 from the oscillator 62, a conventional one-shot multivibrator 64 is triggered to produce a pulse 65 of a fixed duration that is longer than one half cycle, but shorter than one whole cycle, at the frequency of the oscillator 35.

The pulses produced by the multivibrator 64 are applied to one input terminal of a conventional OR gate 66. The signal $\overline{RO}$ is applied to a second input terminal of the gate 66. The gate 66 thus produces a logic one level output signal labeled DROP BIT when either the signal $\overline{RO}$ is present, or when the multivibrator 64 produces an output pulse.

The DROP BIT signal is applied to an output control gate 67. The gate 67 also receives clock pulses OC from the oscillator 35. The frequency of the oscillator 35 is preferably N times the nominal repetition rate of the pilot clock pulses IC, plus a control factor M, where N is a number sufficiently large to provide a level of output smoothing that is acceptable for the particular use for which the compensated signal is intended, and M is a factor added to permit control over the output sampling rate in a manner to be described. For example, for the compensation of motion picture sound signals, N may be 8, and M may be 8,000.

The DROP BIT signals, together with a counter in the gate 67, to be described, control the production of COUNT pulses from the clock pulses OC. These COUNT pulses are applied to the counter 52 to step it through its various states.

Figure 5:
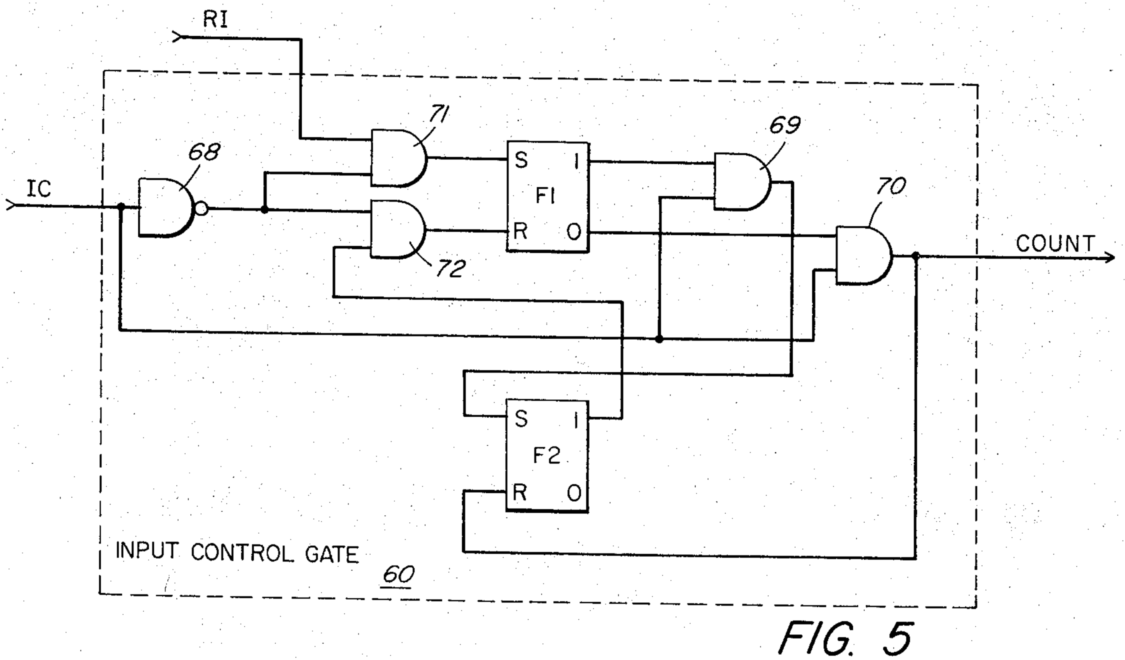
FIG. 5 is a schematic block and wiring diagram of an input control gate forming a part of the control circuit of FIG. 4.

FIG. 5 shows the details of the input control gate 60. As shown, the clock pulses IC are applied to a conventional NAND gate 68, which serves as an inverter and to one input terminal of each of two conventional AND gates 69 and 70. The gate 68 thus produces a logic 1 output signal at its output terminal when, and only when, the clock pulses IC are absent. The gates 69 and 70 produce logic 1 output signals when a clock pulse is present and their second input terminals, connected in a manner to be described, are at logic 1.

The output signal from the gate 68 is applied to one input terminal of each of two AND gates 71 and 72. The second input terminal of the gate 71 receives the signal $\overline{RI}$ from the address comparator 54. The second input terminal of the gate 72 is connected to the logic 1 output terminal of a conventional flip-flop F2. This terminal is at a logic 1 level when the flip-flop F2 is set in a manner to be described.

When the gate 71 produces a logic 1 output signal, a flip-flop F1 is set. When set, a logic 1 signal appears at the logic 1 output terminal of the flip-flop F1 to enable the gate 69, so that the gate 69 will produce a logic 1 output signal at the next clock pulse IC. This logic 1 signal from the gate 69 sets the flip-flop F2.

A logic 1 output signal at the logic 1 output terminal of the flip-flop F2 enables the AND gate 72 to reset the flip-flop F1 when the clock pulse that caused the flip-flop F2 to be set disappears.

The logic zero output terminal of the flip-flop F1 is connected to the second input terminal of the gate 71. Thus, when the flip-flop F1 is reset, and a clock pulse IC appears, a COUNT pulse is produced. This COUNT pulse is applied to reset the flip-flop F2.

Figure 6:
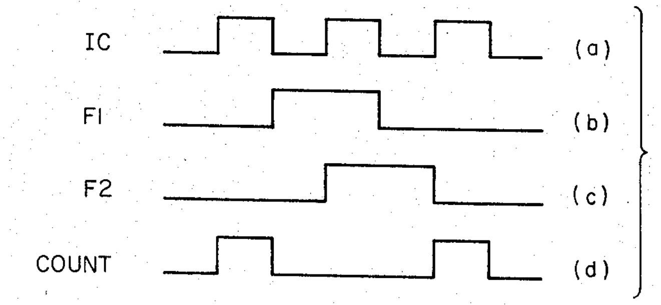
FIG. 6 is a composite timing diagram illustrating the operation of a portion of the apparatus of FIG. 5.

Referring to FIG. 6, a typical operating sequence is shown, which assumes that both flip-flops F1 and F2 are reset, and that the signal $\overline{RI}$ is initially absent. The states of the flip-flops are represented as low when they are reset, and high when they are set, in FIGS. 6*b* and 6*c*. The clock pulses IC, and the COUNT pulses, are shown as high when present and as low when absent.

As the first clock pulse IC is produced with the flip-flop F1 reset, the gate 70 produces a COUNT pulse. Assume that this COUNT pulse causes the address difference detector 54 to produce the signal $\overline{RI}$. When the clock pulse IC disappears, the gate 71 will accordingly set the flip-flop F1, enabling the gate 69 and disabling the gate 70.

When the next pulse IC appears, the gate 70 will not produce a COUNT pulse, but the gate 69 will produce a logic 1 output signal to set the flip-flop F2. As a COUNT pulse has been omitted, and because the input clock and output clock frequencies are maintained relatively close together, an output COUNT pulse will occur sometime during the interval between the end of the first clock pulse IC and the end of the second clock pulse IC. That will cause the signal $\overline{RI}$ to disappear.

Assume that the next clock pulse OC occurs before the end of the second clock pulse IC. That will cause the level $\overline{RI}$ to be removed, disabling the gate 71. When the pulse IC disappears, with the flip-flop F2 set, the gate 72 will reset the flip-flop F1. The gate 70 will then be enabled.

The next clock pulse IC will thus be passed by the gate 70 as a COUNT pulse, and this COUNT pulse will reset the flip-flop F2. It is apparent that the result is to delete a COUNT pulse in response to the presence of the signal $\overline{RI}$ in the absence of a clock pulse IC.

FIG. 7 shows the details of the output control gate 67. The gate 67 is identical in construction and function to the gate 60 first described, except that it is provided with a binary counter 73 to divide the output by the number N, which may be eight, for example.

Briefly, the clock pulses OC are applied to a conventional NAND gate 74, which serves as an inverter and to one input terminal of each of two conventional AND gates 75 and 76. The output signal from the gate 74 is applied to one input terminal of each of two AND gates 77 and 78. The second input terminal of the gate 77 receives the signal DROP BIT from the OR gate 66. The second input terminal of the gate 78 is connected to the logic 1 output terminal of a conventional flip-flop F4.

When the gate 77 produces a logic 1 output signal, a flip-flop F3 is set. When set, the flip-flop F1 enables the gate 75, so that the gate 75 will produce a logic 1 output signal at the next clock pulse OC. This logic 1 signal from the gate 75 sets the flip-flop F4. When set, the flip-flop F4 enables the AND gate 78 to reset the flip-flop F3 when the clock pulse that caused the flip-flop F4 to be set disappears.

The logic zero output terminal of the flip-flop F3 is connected to the second input terminal of the gate 76. Thus, when the flip-flop F3 is reset, and a clock pulse OC appears, a pulse is produced to step the counter 73. This pulse is also applied to reset the flip-flop F4. At each eighth pulse thus applied to the counter 73, a COUNT pulse is produced.

The operating sequence of the gate 67 is the same as that described above for the input control gate 60, except that the gate 67 normally provides only one COUNT pulse for each 8 clock pulses OC. And, since the clock pulses OC and the DROP BIT pulses do not necessarily correspond to address changes, omitting one pulse from the input to the counter 73 may not be sufficient to remove the DROP BIT signal. In that event, the output control gate 67 will omit every other pulse to the counter 73 until the DROP BIT signal is removed.

Specifically, assume that the signal DROP BIT appears following a clock pulse OC. That will set the flip-flop Fe through the gate 77. At the next clock pulse OC, the flip-flop F4 will be set by the gate 75. No pulse will be supplied to the counter 73 by the gate 76 in response to this clock pulse OC.

When the second clock pulse OC has disappeared, the flip-flop F3 will be reset by the gate 78. That will occur even if the signal DROP BIT is still present, assuming that the flip-flop F3 is of the conventional type which changes its state when logic 1 signals are applied to both of the terminals S and R.

The next clock pulse OC will cause the gate 76 to apply a pulse to the counter 73, and reset the flip-flop F4. The chain of operations just described will be repeated, causing the counter 73 to be stepped on every other pulse OC, until the level DROP BIT disappears.

The output address control effected by the gate 67 reduces the minimum delay in changing the output signal So when the output address approaches the input address. Thus, if $N = 8$, the minimum time that the output address is held to allow the input address to catch up in one-eighth of the nominal interval between output clock pulses, instead of the whole interval. The result is that a lower sampling rate can be employed without appreciable distortion than would be required if the output address had to be held for two full clock pulse intervals at each rate correction step.

By properly adjusting the center frequency of the oscillator 62, it is possible to keep the address difference in a range that will very seldom require the dropping of an input clock pulse IC. Of course, the degree of flutter compensation that can be effected in this manner depends on the number of storage locations in the memory 36. In particular, if the time constant of the integrator comprising the amplifier 59 is made too short, the output will follow the input too closely to correct for wow and flutter.

While the invention has been described primarily with respect to the details of a particular motion picture sound system, it will be apparent to those skilled in the art that the apparatus is adaptable to the correction of frequency deviations in other analog information storage and retrieval systems, and in other frequency domains. The only requirements are that the information contained in the signals to be compensated be somewhat redundant, as control is affected by discarding samples, or by repeating samples, in order to keep the size of the memory down. The sampling rate must be high enough to allow this to be done without noticeably distorting the output. Within these limitations, it will be apparent that the invention has wide application to the correction of frequency deviations in reproducing recorded signals.

The overall operation of the system of the invention will in general be apparent from the above description. However, referring to FIG. 1, operation of the system will be briefly reviewed. It is assumed that a strip of movie film 1 of the type shown in FIG. 2, on which a series of photographic transparency frames 7 have been photographed and developed, and on which a sound track 8 has been recorded with the sound to accompany the pictures and the reference tone described, is threaded between the supply reel 2 and the take-up reel 3. Next, assume that the switch S1 is closed to supply power at the potentials B+, Vr1 and Vr2 to the apparatus.

The motor M1 will commence to run, with attendant slippage of the clutch SC to apply tension to the film 1. The motor M2 will operate, with its speed under the control of the speed error signal from the compensator 27 applied to the control network for the amplifier 26. The speed of the film will accordingly be maintained near the desired average value.

The crank 23 will cause the pawl 22 to intermittently advance the film, resulting in an average speed at the playback station 4 that will fluctuate by a flutter component. The reproduced audio signal will be supplied through the amplifier 31 to the filters 32 and 33 in the compensator 27.

Samples of the information signal Si will be read into the memory 36 under the control of the clock pulses IC, at the rate at which zero crossings in the reference signal are read back from the tape. Samples will be read out of the memory to form the output signal So, which will be changed at the rate of the COUNT pulses from the output control gate 67, at a rate centered in the range of the rates of occurrence of the pulses IC.

When the pulses IC occur more rapidly than the output COUNT pulses, the input memory address will move closer to the output memory address. If that occurs relatively slowly, the amplifier 59 will adjust the frequency of the oscillator 62 to produce DROP BIT pulses less frequently, allowing more output pulses to be produced to move the output address away from the input address. If the input address approaches the output address too rapidly for the amplifier 59 to respond, the detection point at which the comparator 57 in FIG. 4 is actuated will be reached, and the signal $\overline{RI}$ will be produced. That will cause sampling in to be interrupted. In effect, an input sample will be discarded to allow the output to catch up.

On the other hand, if the input pulses occur more slowly than the output pulses, the input address will move toward the output address in the opposite direction, until the comparator 56 in FIG. 4 responds to produce the signal $\overline{RO}$. That will inhibit the change of the output memory address for at least one clock pulse OC, allowing the input address sampling to catch up. Since the input samples are taken at times corresponding to equal time intervals during recording, and the output samples are taken at the relatively constant intervals established by the output clock pulses, the information will be restored to the original recorded frequency, except as it is temporarily rephased as the memory tends to overflow in either direction.

It has been found by experiment that a 16 stage memory compensates for fairly extreme conditions of violent flutter such as those encountered in a movie projector at 18 frames per second without distortion appreciable to the ear. The output signal So applied through the low pass filter 37 and the amplifier 38 to the loudspeaker 39 will accordingly produce the recorded frequency accurately. And a particular advantage of the system is that, by relaxing the requirements on the uniformity of the film speed at the playback head, the bobulator roller 12 can effect sufficient isolation between the playback station and the projection station with only small changes in the length of the film path between those stations. Accordingly, lip synchronization is preserved without any additional apparatus.

While the invention has been described with respect to the details of various illustrative embodiments, many changes and variations will occur to those skilled in the art upon reading this description. Such can obviously be made without departing from the scope of the invention.

Having thus described the invention, what is claimed is:

1. Apparatus for compensating an analog signal for phase shifts with the aid of a reference signal having analogous phase shifts from an initially constant frequency, comprising an input terminal adapted to receive said analog signal, memory means comprising a plurality of addressable storage locations, an input address register cyclically operable in response to a series of applied timing signals to connect said input terminal to said locations in a closed ordered sequence to store samples of said analog signal in said memory means, an output address register cyclically operable in response to a series of applied timing signals to connect said locations to said output terminal in said closed ordered sequence to produce an output signal on said output terminal in accordance with the samples stored in said memory means, address difference detecting means controlled by said address registers for producing a control signal in accordance with said difference, means responsive to said reference signal for producing a first train of timing signals at a first rate determined by the frequency of said reference signal, input control gate means inhibited by said control signal when the input address is about to overtake the output address and operable when not inhibited to apply said first train of timing signals to said input address register, variable frequency oscillator means for producing a second train of timing signals at a rate variable about a second rate, integrating means responsive to said control signal for slowly varying the frequency of said oscillator means in accordance with the average value of said difference, constant frequency oscillator means for producing a third train of timing signals at a third rate equal to said second rate plus a predetermined multiple of said initial constant frequency, output control gate means inhibited by said control signal when the output address is about to overtake the input address and by said second train of timing signals and operable when not inhibited to produce an output signal for each of said third timing signals, and dividing means controlled by said output signals for applying a timing signal to said output address register once for each of said predetermined multiple of said output pulses.

2. A compensator for reducing frequency deviations in an information signal recorded simultaneously with a constant frequency reference signal, comprising means for simultaneously reproducing said reference signal and said information signal, an addressable storage register comprising an input terminal, an output terminal, a plurality of storage means, first switching means responsive to a set of applied address signals for connecting a different one of said storage means to said input terminal for each of said address signals to store samples of a signal applied to said input terminal in said storage means, and second switching means responsive to said set of applied address signals for connecting a different one of said storage means to said output terminal to produce a signal on said output terminal determined by the samples stored in said storage means, means responsive to said reproducing means for applying said reproduced information signal to said input terminal, first cyclic address signal producing means controlled by said reproducing means for sequentially applying address signals of said set to said first switching means at a first rate determined by the frequency of said reproduced reference signal, adjustable signal generating means for producing a first control signal at a frequency adjustable about a second frequency, sensing means controlled by said first and second address signal producing means for producing a second control signal in accordance with the difference between the address signals produced, integrating means controlled by said sensing means for producing a control signal in accordance with the average value of said difference, signal generating means for producing a second control signal at a third frequency equal to said second frequency plus a predetermined multiple of said constant frequency at which said reference signal was recorded, second cyclic address signal producing means responsive to a train of applied signals to sequentially apply address signals of said set to said second switching means, gate means controlled by said variable signal generating means and said seocnd signal generating means for producing output signals at a rate equal to said third frequency minus the frequency of said first control signal, and dividing means responsive to said output signals for applying a signal to said second cyclic address signal producing means for each of said mutiple of said output pulses.

3. Apparatus for compensating an information signal that has been recorded and reproduced simultaneously with a reference signal, said reference signal having a first frequency when recorded, comprising a storage register having the capacity to store a plurality of samples of the information signal, sampling means controlled by the reproduced reference signal for storing samples of the information signal in said register at a first rate determined by the frequency of the reproduced reference signal, an output terminal, switching means for applying samples stored in said register to said output terminal in the sequence in which they were stored at a second rate determined by the repetition rate of a train of applied signals, means for detecting the number of samples stored in said register that have not been applied to said output terminal for producing a first control signal, averaging means for producing a second control signal in accordance with the time average of said first control signal, variable frequency signal generating means for producing a first train of signals at a frequency variable about a second frequency, means for producing a second train of signals at a constant third rate equal to said second frequency plus a predetermined multiple of said first frequency, gate means controlled by said first and second trains of signals for producing output signals at the rate of one for each signal of said second train minus one for each signal of said first train, dividing means for applying a signal to said switching means for each of said multiple of output pulses, and means for applying said second control signal to said variable frequency signal generating means for gradually adjusting said second rate toward the average value of said first rate.

4. The apparatus of claim 3, further comprising means responsive to said first control signal for interrupting the operation of said gate means when the number of samples stored in said register that have not been applied to said output terminal falls below a predetermined number.

5. The apparatus of claim 3, further comprising means responsive to said first control signal for interrupting the operation of said sampling means when the number of samples stored in said register that have not been applied to said output terminal exceeds a predetermined number.

6. The apparatus of claim 5, further comprising means responsive to said first control signal for interrupting the operation of said gate means when the number of samples stored in said register that have not been applied to said output terminal falls below a predetermined value.

7. In a sound motion picture projection system, means forming a projection station at a first location, means forming a playback station comprising transducer means adapted to reproduce an audio signal at a second location spaced from said first location, means for mounting a strip of motion picture film on which a series of photographic images, an accompanying sound signal, and a pilot signal initially having a first frequency are recorded for movement along a path between said projection station and said playback station, incremental drive means at said projection station for incrementally moving a strip of film along said path, means located along said path between said projection station and said playback station for damping accelerations of film moving along said path to produce a relatively uniform film speed at said playback station when the film is moved incrementally past said playback station, means controlled by said transducer means for simultaneously reproducing separate sound and pilot signals from a strip of film moving past said playback station, storage means, sampling means for storing samples of the reproduced sound signal in said storage means at a sampling rate determined by the frequency of said reproduced pilot signal, a loudspeaker, switching means for applying stored samples from said storage means to said loudspeaker in the order in which they were stored at a second rate determined by the frequency of a train of applied signals, means for deteccing the number of samples stored in said storage means that have not been applied to said loudspeaker for producing a first control signal, integrating means for producing a second control signal in accordance with the average of said first control signal, variable frequency signal generating means for producing a train of signals at a frequency variable about a second frequency, means for producing a third train of signals at a constant third rate equal to said second frequency plus a predetermined multiple of said first frequency, gate means controlled by said first and second trains of signals for producing output signals at the rate of one for each signal of said third train minus one for each signal of said second train, dividing means for applying a signal to said switching means for each of said multiple of output pulses, and means for applying said second control signal to said variable frequency signal generating means for gradually adjusting said second rate toward the average value of said first rate.

8. The apparatus of claim 7, further comprising means responsive to said first control signal for interrupting the operation of said gate means when the number of samples stored in said storage means that have not been applied to said loudspeaker falls below a predetermined number.

9. The apparatus of claim 7, further comprising means responsive to said first control signal for interrupting the operation of said sampling means when the number of samples stored in said storage means that have not been applied to said loudspeaker exceeds a predetermined number.

10. The apparatus of claim 9, further comprising means responsive to said first control signal for interrupting the operation of said gate means when the number of samples stored in said storage means that have not been applied to said loudspeaker falls below a predetermined value.

11. The apparatus of claim 7, in which said incremental drive means is adjustable to control the average speed at which film is advanced, and further comprising means responsive to said first control signal for adjusting the speed of said drive means to reduce the average difference between said sampling rate and said second rate.

12. The apparatus of claim 8, in which said incremenal drive means is adjustable to control the average speed at which film is advanced, and further comprising means responsive to said first control signal for adjusting the speed of said drive means to reduce the average difference between said sampling rate and said second rate.

13. The apparatus of claim 9, in which said incremental drive means is adjustable to control the average speed at which film is advanced, and further comprising means responsive to said first control signal for adjusting the speed of said drive means to reduce the average difference between said sampling rate and said second rate.

14. The apparatus of claim 10, in which said incremental drive means is adjustable to control the average speed at which film is advanced, and further comprising means responsive to said first control signal for adjusting the speed of said drive means to reduce the average difference between said sampling rate and said second rate.

15. Apparatus for reproducing a motion picture and an accompanying sound signal recorded on a strip of film simultaneously with a pilot signal, said pilot signal having a first frequency when recorded, comprising transducer means for simultaneously reproducing the sound signal and the pilot signal when the strip is moved past said transducer means, said signals being reproduced at frequencies dependent on the speed of said movement, projection means spaced from said transducer means for projecting optical images from images on the film when the film is incrementally moved past said projection means, film receiving means for mounting the film for movement past said transducer means and said projection means, film drive means adjacent said projection means and adapted to engage a strip of film mounted on said receiving means to incrementally advance the film past said projection means, motion damping means mounted between said transducer means and said projection means and adapted to engage a strip of film mounted on said receiving means to damp changes in the speed of the film past said transducer means when the film is incrementally advanced by said drive means, storage means, sampling means responsive to said reproduced pilot signal for storing samples of said reproduced information signal in said storage means at a first rate determined by the frequency of said reproduced pilot signal, a loudspeaker, switching means for applying samples from said storage means to said loudspeaker at a second rate determined by the frequency of a train of applied signals, means for detecting the number of samples stored in said storage means that have not been applied to said loudspeaker for producing a first control signal, averaging means for producing a second control signal in accordance with the average of said first control signal, adjustable signal generating means for producing a first train of signals at a frequency variable about a second frequency, means for producing a second train of signals at a constant frequency equal to said second frequency plus a predetermined multiple of said first frequency, gate means controlled by said first and second trains of signals for producing output signals at the rate of one for each signal of said second train minus one for each signal of said first train, dividing means for applying a signal to said switching means for each of said multiple of output pulses, and means for applying said second control signal to said adjustable signal generating means for gradually adjusting said second rate toward the average value of said first rate.

16. The apparatus of claim 15, further comprising means responsive to said first control signal for interrupting the operation of said gate means when the number of samples stored in said storage means that have not been applied to said loudspeaker falls below a predetermined number.

17. The apparatus of claim 15, further comprising means responsive to said first control signal for interrupting the operation of said sampling means when the number of samples stored in said register that have not been applied to said output terminal exceeds a predetermined number.

18. The apparatus of claim 17, further comprising means responsive to said first control signal for interrupting the operation of said gate means when the number of samples stored in said register that have not been applied to said output terminal falls below a predetermined value.

19. The apparatus of claim 15, in which said film drive means is adjustable to vary the average speed at which film is advanced past said projection means, and further comprising means responsive to said first control signal for adjusting said drive means to reduce the average difference between said first rate and said second rate.

20. The apparatus of claim 16, in which said film drive means is adjustable to vary the average speed at which film is advanced past said projection means, and further comprising means responsive to said first control signal for adjusting said drive means to reduce the average difference between said first rate and said second rate.

21. The apparatus of claim 17, in which said film drive means is adjustable to vary the average speed at which film is advanced past said projection means, and further comprising means responsive to said first control signal for adjusting said drive means to reduce the average difference between said first rate and said second rate.

22. The apparatus of claim 18, in which said film drive means is adjustable to vary the average speed at which film is advanced past said projection means, and further comprising means responsive to said first control signal for adjusting said drive means to reduce the average difference between said first rate and said second rate.

23. In a sound motion picture projector, film support means for supporting a strip of film on which photographic images, an audio information signal, and a pilot signal have been synchronously recorded for movement back and forth along a path between a playback station and a porjection station, film drive means adjacent said projection station for incrementally advancing a strip of film supported by said support means past said projection station, projection means adjacent said projection station for projecting the images recorded on the film, motion damping means located between said stations and adapted to engage a strip of film supported by said support means to produce a film speed past said playback station in accordance with the average speed of the film past said projection station when the film is incrementally advanced by said drive means, transducer means located at said playback station for simultaneously reproducing the information signal and the pilot signal from a strip of film moving past said playback station, an input terminal, filter means controlled by said transducer means for applying the reproduced information signal to said input terminal, memory means comprising a plurality of addressable storage locations, an input address register cyclically operable in response to a series of applied timing signals to connect said input terminal to said locations in a closed ordered sequence to store samples of said information signal in said memory means, an output address register cyclically operable in response to a series of applied timing signals to connect said locations to said output terminal in said closed ordered sequence to produce an output signal on said output terminal in accordance with the samples stored in said memory means, address difference detecting means controlled by said address registers for producing a control signal in accordance with said difference, means responsive to said reference signal for producing a first train of timing signals at a first rate determined by the frequency of said reference signal, input control gate means inhibited by said control signal when the input address is about to overtake the output address and operable when not inhibited to apply said first train of timing signals to said input address register, variable frequency oscillator means for producing a second train of timing signals at a rate variable about a second rate, integrating means responsive to said control signal for slowly varying the frequency of said oscillator means in accordance with the average value of said difference, constant frequency oscillator means for producing a third train of timing signals at a third rate equal to said second rate plus a predetermined multiple of said initial constant frequency, output control gate means inhibited by said control signal when the output address is about to overtake the input address and by said second train of timing signals and operable when not inhibited to produce an output signal for each of said third timing signals, and dividing means controlled by said output signals for applying a timing signal to said output address register once for each of said predetermined multiple of said output pulses.

24. An analog information storage and retrieval system, comprising a record on which there have been simultaneously recorded an analog signal and a reference signal, said reference signal being recorded at a first frequency, means for reproducing said signals, an analog storage register, sampling means controlled by said reproducing means for storing samples of said reproduced information signal in said register at a rate determined by the frequency of the reproduced reference signal, an output terminal, switching means for applying samples stored in said memory to said output terminal at a rate controlled by the frequency of a train of applied signals, means for detecting the difference between the rate at which samples are stored in said memory and the rate at which the samples are applied to said output terminal, means controlled by said detecting means for producing a first control signal in accordance with the average of said detected difference over a period that is long with respect to the average interval between the storage of samples in said memory, a variable frequency oscillator for producing a second control signal varying about a second frequency, a constant frequency oscillator for producing a train of signals at a third frequency equal to said second frequency plus a predetermined multiple of said first frequency, gate means controlled by said second control signal and said signals from said constant frequency oscillator for producing output signals at a rate equal to said third frequency minus the frequency of said second control signal, dividing means responsive to said output signals for applying a train of signals to said switching means at the rate of one for each of said multiple of said output pulses, and means responsive to said first control signal for adjusting the frequency of said variable frequency oscillator to reduce the average value of said difference.

25. The apparatus of claim 24, further comprising means responsive to said first control signal for interrupting the operation of said sampling means when the number of samples that have been stored in said register exceeds the number that have been applied to said output terminal by a predetermined number.

26. The apparatus of claim 24, further comprising means responsive to said first control signal for inhibiting the operation of said gate means when the rate at which samples are applied to said output terminal exceeds the rate at which samples are stored in said register for a time sufficient to reduce the number of samples stored in said register that have not been applied to said output terminal below a predetermined number.

27. The apparatus of claim 26, further comprising means responsive to said first control signal for interrupting the operation of said sampling means when the difference between the number of samples that have been stored in said register exceeds the number that have been applied to said output terminal by a predetermined number.

28. The apparatus of claim 24, in which said means for reproducing said signals comprises transducer means and variable speed drive means connected to said record for moving said record relative to said transducer means, and further comprising means responsive to said first control signal for adjusting the speed of said drive means to reduce the average value of said difference.

29. The apparatus of claim 25, in which said means for reproducing said signals comprises transducer means and variable speed drive means connected to said record for moving said record relative to said transducer means, and further comprising means responsive to said first control signal for adjusting the speed of said drive means to reduce the average value of said difference.

30. The apparatus of claim 26, in which said means for reproducing said signals comprises transducer means and variable speed drive means connected to said record for moving said record relative to said transducer means, and further comprising means responsive to said first control signal for adjusting the speed of said drive means to reduce the average value of said difference.

31. The apparatus of claim 27, in which said means for reproducing said signals comprises transducer means and variable speed drive means connected to said record for moving said record relative to said transducer means, and further comprising means responsive to said first control signal for adjusting the speed of said drive means to reduce the average value of said difference.

32. Apparatus for reproducing an analog signal recorded simultaneously with a periodic reference signal at a first frequency, comprising transducer means for simultaneously reproducing said recorded signals, an input terminal, a first band pass filter connected between said transducer means and said input terminal for selectively applying the reproduced analog signal to said input terminal, memory means comprising a plurality of addressable storage means, sampling means responsive to a series of applied input clock pulses for sequentially connecting said input terminal to said storage means in a predetermined address sequence to store samples of said analog signal in said memory means, an output terminal, output signal producing means responsive to a series of applied clock pulses for sequentially connecting said storage means to said output terminal in said predetermined address sequence, address difference detecting means controlled by said sampling means and said output signal producing means for producing a first control signal indicative of the difference between the number of samples stored in said memory means and the number that have been applied to said output terminal, first clock pulse generating means for producing a train of clock pulses at a rate determined by the frequency of an applied signal, a second band pass filter connected between said transducer means and said clock pulse generating means for selectively applying the reproduced reference signal to said first clock pulse generating means, input gate means connected to said clock pulse generating means for applying input clock pulses to said sampling means, means responsive to said first control signal for inhibiting the operation of said input gate means when the number of samples stored by said sampling means exceeds the number that have been applied to said output terminal by a first number, variable frequency pulse generating means for producing a train of pulses at a frequency variable about a second frequency, sensing means responsive to said first control signal for producing a second control signal when the number of samples stored by said sampling means exceeds the number applied to said output terminal by a second number lower than said first number, second clock pulse generating means for producing a train of clock pulses at a fixed frequency equal to said second frequency plus a predetermined multiple of said first frequency, first bistable means settable to first and second states, means controlled by said second clock pulse operating means, said sensing means and said variable frequency pulse generating means for setting said first bistable means to its first state when either a pulse from said variable frequency pulse generating means or said second signal is present in the absence of a clock pulse from said second clock pulse generating means, second bistable means settable to first and second states, means controlled by said first bistable means in its first state and responsive to a clock pulse produced by said second clock pulse generating means for setting said second bistable means to its first state, means controlled by said second bistable means and said second clock pulse generating means for setting said first bistable means to its second state when said second bistable means is in its first state in the absence of a clock pulse from said second clock pulse generating means, means controlled by said first bistable means in its second state and responsive to a clock pulse produced by said second clock pulse generating means for producing an output pulse, means responsive to said output pulses for setting said second bistable means to its second state, counting means responsive to said output pulses for applying a clock pulse to said output signal producing means each time said predetermined multiple of output pulses is produced, and integrating means responsive to said first control signal for adjusting the frequency of said variable frequency signal generating means to move the average rate at which samples are applied to said output terminal toward the average rate at which samples are stored by said sampling means.

* * * * *

UNITED STATES PATENT OFFICE
CERTIFICATE OF CORRECTION

Patent No. 3,774,999 Dated November 27, 1973

Inventor(s) Andrew S. Ivestor and William R. Wray

It is certified that error appears in the above-identified patent and that said Letters Patent are hereby corrected as shown below:

On the title page, after the inventors' names insert --[73] Assignee: Polaroid Corporation, Cambridge, Massachusetts--.

Signed and sealed this 4th day of June 1974.

(SEAL)
Attest:

EDWARD M.FLETCHER,JR.
Attesting Officer

C. MARSHALL DANN
Commissioner of Patents